US010270799B2

(12) United States Patent
Vasudevan et al.

(10) Patent No.: US 10,270,799 B2
(45) Date of Patent: Apr. 23, 2019

(54) METHODS AND SYSTEMS FOR PREDICTING VULNERABILITY STATE OF COMPUTER SYSTEM

(71) Applicant: Paladion Networks Private Limited, Reston, VA (US)

(72) Inventors: Vinod Vasudevan, Fairfax, VA (US); Rajat Mohanty, Fairfax, VA (US); Harshvardhan Parmar, Herndon, VA (US)

(73) Assignee: PALADION NETWORKS PRIVATE LIMITED, Reston, VA (US)

( * ) Notice: Subject to any disclaimer, the term of this patent is extended or adjusted under 35 U.S.C. 154(b) by 131 days.

(21) Appl. No.: 15/587,067

(22) Filed: May 4, 2017

(65) Prior Publication Data

US 2017/0324763 A1 Nov. 9, 2017

Related U.S. Application Data

(60) Provisional application No. 62/331,731, filed on May 4, 2016.

(51) Int. Cl.
*G06F 21/00* (2013.01)
*H04L 29/06* (2006.01)

(52) U.S. Cl.
CPC ...... *H04L 63/1433* (2013.01); *H04L 63/1425* (2013.01); *H04L 63/1441* (2013.01)

(58) Field of Classification Search
None
See application file for complete search history.

(56) References Cited

U.S. PATENT DOCUMENTS 8,099,760 B2 * 1/2012 Cohen ................ H04L 63/1433
726/2
8,272,061 B1 * 9/2012 Lotem ................... G06F 21/577
709/223

(Continued)

OTHER PUBLICATIONS

Abercrombie, Robert K. et al. Risk and Vulnerability Assessment Using Cybernomic Computational Models: Tailored for Industrial Control Systems. Proceedings of the 10th Annual Cyber and Information Security Research Conference, CISR'15. https://dl.acm.org/citation.cfm?id=2746284 (Year: 2015).*

(Continued)

*Primary Examiner* — Jeremiah L Avery
(74) *Attorney, Agent, or Firm* — Schott, P.C.

(57) ABSTRACT

A system uses a probabilistic technique to determine the vulnerability of similar assets based on the data provided on some assets. The probabilistic technique includes stages of preparing data followed by calculating probability; a preparing data stage, including gathering the latest vulnerability reports of all assets in a system with the help of known scanners; creating open vulnerabilities; enriching the obtained data of open vulnerabilities; creating all vulnerabilities; enriching the obtained data of all vulnerabilities. Following this stage, probability calculation may be done for three cases, when asset information is known, when asset information is partially unknown, and when asset information is completely unknown based on the data taken from open vulnerabilities and all vulnerabilities categorized into blocks of 6 months based on the time at which they have been reported to NIST/MITRE.

15 Claims, 12 Drawing Sheets

(56) References Cited

U.S. PATENT DOCUMENTS

| | | | | |
|---|---|---|---|---|
| 8,312,549 B2* | 11/2012 | Goldberg | ............... | G06Q 40/08 |
| | | | | 705/7.11 |
| 2003/0212779 A1* | 11/2003 | Boyter | ................... | H04L 41/22 |
| | | | | 709/223 |
| 2009/0077666 A1* | 3/2009 | Chen | ..................... | G06F 21/577 |
| | | | | 726/25 |
| 2010/0319069 A1* | 12/2010 | Granstedt | ........... | H04L 63/0263 |
| | | | | 726/22 |
| 2011/0252479 A1* | 10/2011 | Beresnevichiene | ......................... | |
| | | | | H04L 63/1433 |
| | | | | 726/25 |
| 2013/0104236 A1* | 4/2013 | Ray | ..................... | H04L 63/1433 |
| | | | | 726/25 |
| 2013/0191919 A1* | 7/2013 | Basavapatna | ......... | G06F 21/577 |
| | | | | 726/25 |
| 2014/0157405 A1* | 6/2014 | Joll | ..................... | H04L 63/1425 |
| | | | | 726/22 |
| 2015/0381649 A1* | 12/2015 | Schultz | ............... | H04L 63/1433 |
| | | | | 726/25 |
| 2016/0205122 A1* | 7/2016 | Bassett | ................. | G06F 21/577 |
| | | | | 726/23 |
| 2016/0226905 A1* | 8/2016 | Baikalov | ............. | H04L 63/1408 |

OTHER PUBLICATIONS

Mirkhani, Shahrzad et al. Efficient Soft Error Vulnerability Estimation of Complex Designs. Proceedings of the 2015 Design, Automation and Test in Europe Conference and Exhibition. https://dl.acm.org/citation.cfm?id=2755776 (Year: 2015).*

* cited by examiner

| 210 | 220 | 310 | 320 | 330 | 340 |
|---|---|---|---|---|---|
| Name of vulnerability | Asset | Asset Criticality | Vulnerability Severity | Applicable platforms | Reported date |
| Help based buffer overflow in glibe | OS | Medium | High (CVSS Score = 10.0) | glibe v. 2.2, glibe v 2.17 | Apr-17 |

| Names of vulnerability (610) | CVSS score of vulnerability (620) | Reported date (630) | Applicable platforms (640) |
|---|---|---|---|
| | | | |

| Time period (710) | | | | | |
|---|---|---|---|---|---|
| | 0-6 months | 7-12 months | 13-18 months | 19-24 months | 25-30 months | 31-36 months |
| All vulnerabilities | | | | | | |

| | | 1040 | | | | |
|---|---|---|---|---|---|---|
| Vulnerability Severity (when asset information is completely unknown) ||||||||
| | 0-6 months | 7-12 months | 13-18 months | 19-24 months | 25-30 months | 31-36 months |
| Open vulnerabilities | Count of all open vulnerabilities | | | | | |
| All vulnerabilities | Count of all applicable vulnerabilities | | | | | |
| No. of assets | Number of assets on which the vulnerabilities were found | | | | | |

1010 → Open vulnerabilities row
1020 → All vulnerabilities row
1030 → No. of assets row

METHODS AND SYSTEMS FOR PREDICTING VULNERABILITY STATE OF COMPUTER SYSTEM

BACKGROUND

Computer security and vulnerability is a constantly evolving field and given vulnerability status information for some assets, the system and method herein predicts the probability of other, similar assets being open to vulnerability.

In large interconnected networks, electronic attacks may originate at one place and propagate rapidly across a company's programs and systems. Such attacks and propagation are successful because the systems have vulnerabilities in them that have either not been detected or have not been remediated, and also the systems are usually connected, which leads to widespread damage.

To protect computer systems, organizations conduct vulnerability assessments and carry out threat monitoring. Vulnerability assessment looks for potential security weaknesses in a computer system by using a variety of vulnerability scanning system tools and methods. The makers of software (operating systems, business software, etc., hereafter referred to as "platforms") disclose vulnerabilities organized through an industry-wide accepted system from the Common Vulnerabilities Enumeration (CVE) repository, maintained by NIST/MITRE, in which vulnerability is scored using the Common Vulnerability Scoring System (CVSS).

For every disclosed vulnerability, the original maker of the corresponding software distributes a patch, which is a software update that closes the vulnerability. Organizations need to apply such patches to their assets to close the vulnerability.

Another aspect of security management is threat monitoring. Threat monitoring is carried out by tools such as intrusion detection systems, web application firewalls, log analysis systems or security information and event management (SIEM) products. Threat monitoring detects computer attacks and abuses carried by computer users or automated software.

To have effective security, organizations aim to integrate their threat monitoring data with vulnerability assessment data. The data from vulnerability assessment indicates whether an open vulnerability on the computer system exists that can be exploited by an attacker. When the threat monitoring system detects a threat on that computer system, it can correlate the threats with the existence (or lack thereof) of a corresponding open vulnerability and can determine whether the attack is likely to succeed or not. Currently, security systems such as SIEM have the capabilities to correlate such data once the vulnerability data and threat data are given as input to SIEM.

In any large network, however, the vulnerability data is not always present for all computer systems in the network. This is due to the fact that large networks cannot afford to test for all vulnerabilities across all of their systems at all times to avoid overload on networks and the cost and effort involved in such exercises can be limiting. Vulnerability testing is therefore carried out in periodic time frames that usually correlate to network downtime, and at each period it is done only for a part of the network on a sample basis. So, at any given point in time for a particular computer system, either there will be no data about its vulnerable state or that data will be of some past test schedule and will not reflect the current vulnerability state. Without the current vulnerability data, it can be impossible to make an assessment of the impact of the threat seen from the threat monitoring system. Consequently, security administrators are overburdened with volume of threat data that cannot be prioritized or filtered out due to lack of data on the vulnerability of the systems.

The lack of current vulnerability data also affects an organization's ability to know their overall vulnerability status at any given point in time. Organizations can view the vulnerability data as provided by the last tests for an asset, but that information does not provide the status of all assets at the current time.

SUMMARY OF THE EMBODIMENTS

A system uses a probabilistic technique to determine the vulnerability of similar assets based on the data provided on some assets. The probabilistic technique includes stages of preparing data followed by calculating probability; a preparing data stage, including gathering the latest vulnerability reports of all assets in a system with the help of known scanners; creating open vulnerabilities; enriching the obtained data of open vulnerabilities; creating all vulnerabilities; enriching the obtained data of all vulnerabilities.

Following this stage, probability calculation may he done for three cases, when asset information is known, when asset information is partially unknown, and when asset information is completely unknown based on the data taken from open vulnerabilities and all vulnerabilities categorized into blocks of 6 months based on the time at which they have been reported to NIST/MITRE.

BRIEF DESCRIPTION OF THE DRAWINGS

The foregoing and other features of the present invention will become more apparent from the following detailed description of steps when read in conjunction with the accompanying drawings.

DETAILED DESCRIPTION OF THE EMBODIMENTS

Introduction

The system described herein predicts the vulnerability state of an asset from partial vulnerability data obtained from periodic tests on other assets. This predicted vulnerability information may be used so that the threats seen on an asset from the threat monitoring system can be prioritized for response by correlating them to the likelihood of the existence of corresponding vulnerabilities. The system may also provide an overall summary status of vulnerability across a large network using partial vulnerability data obtained from periodic tests so that appropriate measures can be taken to ensure security of the asset.

The system may also mine, handle, and compute the factors that are critical in predicting the vulnerability. To this end, efficient ways of retrieving relevant data from multiple sources, appropriate indexing, and then applying logical conclusions using the methods and systems are described herein.

The methodology may include a prediction model that extrapolates known vulnerability information about some assets in order to guess the vulnerability statuses on other assets having similar profiles. The method makes use of asset criticality, vulnerability severity, and platform information to create a timeline-based asset profile.

An organization may use certain criteria and have certain patterns for applying patches. These criteria and patterns may be based on a variety of factors, including availability of people resources, the organization's risk appetite, IT process maturity, internal policies, compliance and regulatory requirements, etc. A knowledge of patching patterns within the organization can be an indicator towards knowing the status of a vulnerability on an asset. Patching patterns, however, are not easily discernable in most organizations.

When an attack or threat is detected against an asset, the method and system herein may be used to determine the probability that a vulnerability exists corresponding to the attack or threat detected on the asset. If the probability of the vulnerability existing is high, the threat may receive a high rating since there is correlation between the threat/attack that is detected and corresponding vulnerability to exploit is open. In this scenario, the vulnerability may be addressed with immediate action taken to block the attacker and more attacks from the attacker IP and/or patching the vulnerability. If the vulnerability probability is low, no action may be taken or the patching may be delayed.

Therefore, there is a need for a prediction model that extrapolates known vulnerability information about some assets in order to guess the vulnerability statuses on other assets having a similar profile. The system provides such a prediction model that makes use of Asset criticality, Vulnerability severity and Platform information to create a timeline-based patching profile for use in the patching discussed above.

The prediction method comprises stages of preparing data followed by calculating a probability value. The preparing data stage includes the steps of: gathering previous vulnerability reports of any assets in a system, which may have been reported by running security scanners or by manual security testing or any combination thereof; creating a list of all open vulnerabilities found in these reports; storing them in a table; assigning contextual data of asset criticality to the obtained data of open vulnerabilities, vulnerability severity, platform affected, and time of vulnerability disclosure. Following this stage, the probability calculation stage may include the steps of calculating the probability when asset information is known, when asset information is partially unknown, and when asset information is completely unknown. The alerts raised from a threat monitoring system for an asset may be matched with the predicted vulnerability status and prioritized if there is a match between the threat and open vulnerability.

Description

The method herein provides a probabilistic model to determine the vulnerability of similar assets based on the data provided on some assets. The methodology comprises a prediction model that extrapolates known vulnerability information about some assets in order to predict the vulnerability statuses on other assets having a similar profile. The method makes use of asset criticality, vulnerability severity, and platform information to create a timeline-based patching profile.

As used herein, an 'asset' refers to a computer system that is used by an organization to perform business functions. Assets could be an operating system, database, webserver, router, switches, business applications, or web applications. Every asset has characteristics that defines it, such as the name of the application (also called platform), its version number, the IP addresses given to it, the services and ports it uses, and the criticality value to business. Such information about each asset's characteristics may be fully known, partially known, or unknown at any point in time in an organization.

Figure 1:
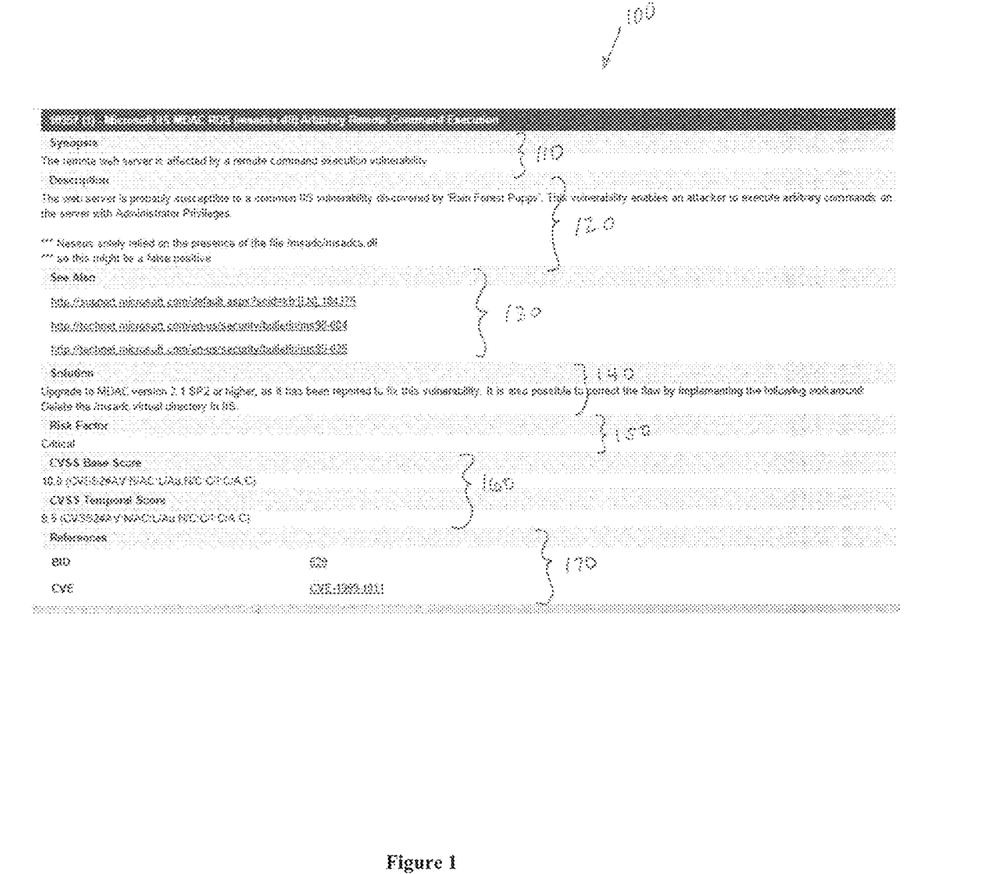
FIG. 1 shows a sample vulnerability report obtained from a typical scanner.

FIG. 1 shows a sample asset vulnerability report 100 from a vulnerability scanner. The report shows a synopsis, 110, description 120, related links 130, solution to the vulnerability 140, risk criticality 150, CVSS scores 160, and related references 170. The system herein uses hardware, namely a computer, a processor, a scan database, and a graphics processor to generate the report and store the obtained data respectively. The accumulation of these vulnerability reports creates a knowledge base of vulnerabilities.

FIGS. 2-10 show various tables that serve as a structure for organizing the system.

Figure 2:
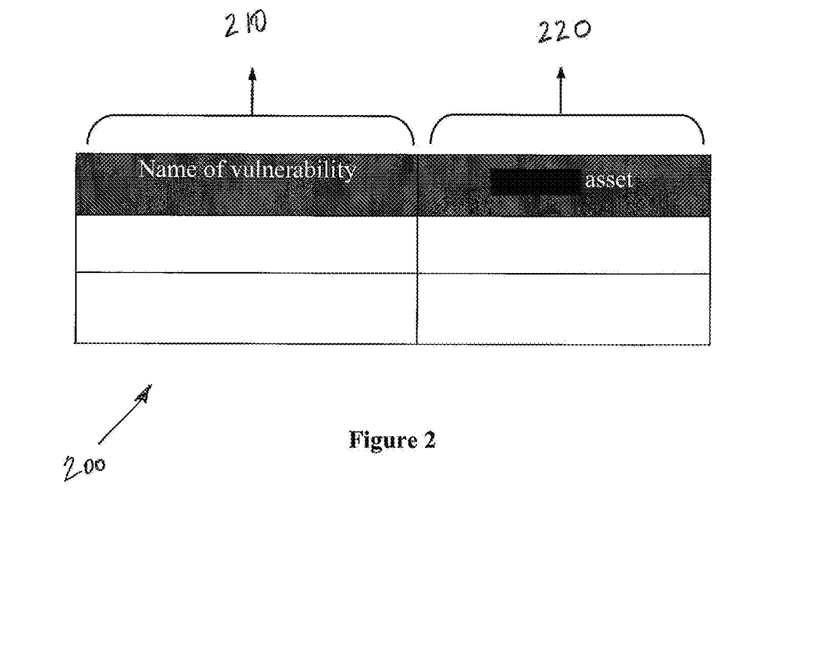
FIG. 2 shows the list of open vulnerabilities on all the assets taken from past vulnerability reports.

FIG. 2 shows a running tabulation of open vulnerabilities 210 derived on all the assets 220 from the accumulated vulnerability data reports 100. The system accumulates the latest vulnerability reports 100 of all assets, creating a list of all the open vulnerabilities found in these reports 100, and stores them in an open vulnerabilities table 200. Duplicate entries may be made for each such vulnerability found on multiple assets in the table 200. The table 200 shows the list of open vulnerabilities data 210 and the user's corresponding assets 220 affected.

Figure 3:
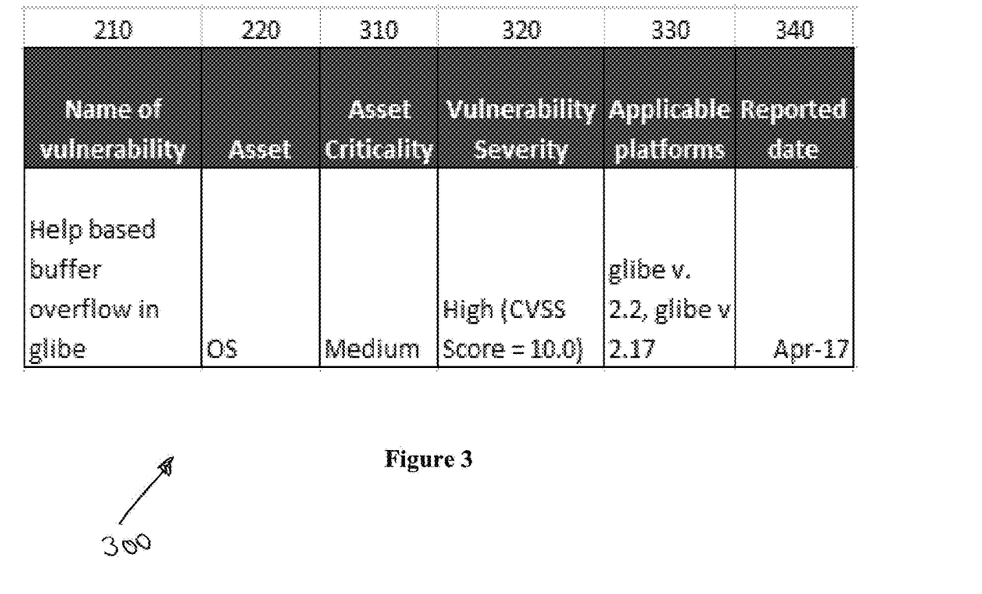
FIG. 3 shows the enriched Open Vulnerabilities data table.

FIG. 3, an expanded open vulnerabilities data table 300 derived from the open vulnerabilities table 200. The enriched table 300 introduces certain new fields related to each vulnerability.

1. Criticality of the asset 310. Criticality of the asset 310 on which the vulnerability was found may be obtained from the asset information maintained by the user. This relates to the relative importance of the asset within a user's organization. For example, the credit card processing asset may be of highest importance to an online retailer, while its printer server may be less important. The user sets these ratings based on their business needs.

2. Vulnerability severity 320. Severity of the vulnerability 320 may be obtained from a vulnerability report 100. Should different scoring mechanisms be used, or multiple vulnerability reports 100 be received, the scoring for severity may need to be normalized within the system. Normalizing the vulnerability severity rating further involves steps converting other formats of scores into an equivalent CVSS score and converting categories to the equivalent CVSS score.

The vulnerability severity rating 320 may be provided in one of the following ways:

A standard CVSS score obtained from CVE repository maintained by NIST/MITRE (scored on a scale of 10), a numerical score on a scale fixed by the scanner vendor obtained in the market, categorization of the CVSS scores with severity rating values like 'High,' 'Medium,' or 'Low' provided by the National Vulnerability Database (NVD). These qualitative ratings are simply mapped from the numeric CVSS scores. For example, Vulnerabilities are labelled "Low" severity if they have a CVSS base score of 0.0-3.9, Vulnerabilities are labelled "Medium" severity if they have a base CVSS score of 4.0-6.9.

Vulnerabilities are labelled "High" severity if they have a CVSS base score of 7.0-10.0.

One way to calculate the vulnerability severity rating would be to use CVSS and National Vulnerability Database (NVD) ratings as a standard way of measuring a vulnerability severity and converting other formats into an equivalent CVSS score along with NVD ratings. For example, convert the numerical score to an equivalent score on a scale of 10. If the custom score is 4 on a scale of 5, the equivalent CVSS score would be 8 and NVD value would be labeled "High".

3. Applicable platform vulnerability 330. This data 330 can be derived from the asset information on the system in which the scan was performed. The platform information acquired from a vulnerability report 320 may be superset of all platform versions to which the vulnerability is applicable. It may be cross-verified with platform version detail present in asset information to only retain the platform version on the asset from the superset in vulnerability report 330.

4. Reported date 340 may be determined from the NVD CVE repository, which may include details about when the vulnerability was disclosed to NIST/MITRE.

The expanded vulnerability table 300 thus adds fields of data relevant to decisions about how to address vulnerabilities. The order of addressing these vulnerabilities increases overall user system performance not only by addressing vulnerabilities, but by allowing the system to prioritize (higher first, lower later) when it will address those vulnerabilities.

Figure 4:
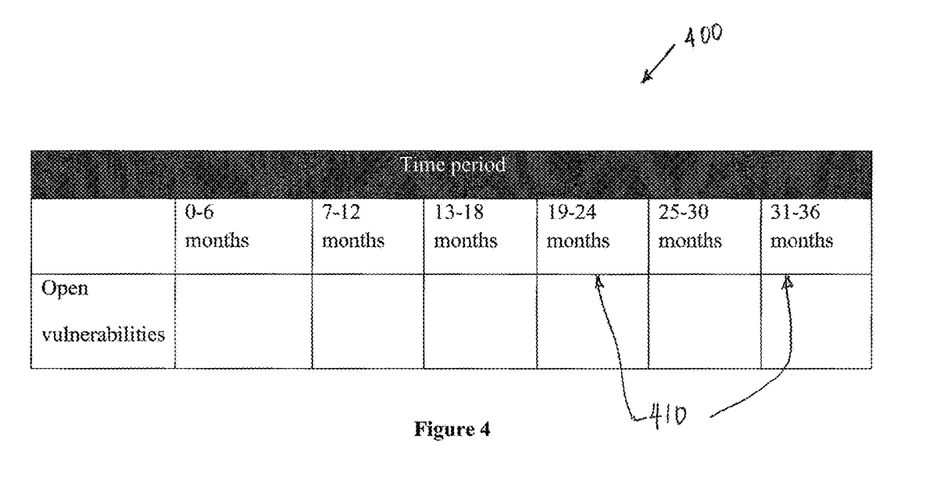
FIG. 4 shows the categorized vulnerabilities in the Open Vulnerabilities table, divided into increments of 6 months during which the vulnerability has been reported to National Institute of Standards and Technology (NIST)/MITRE.

FIG. 4 shows an open vulnerabilities timeline table 400 organized into blocks of 6 months 410, or other time period as may be suitable, based on the time at which each vulnerability has been disclosed to NIST/MITRE. This is another data point that may inform the system as to which vulnerability to prioritize in addressing and patching open vulnerabilities, where older (or newer) vulnerabilities may take priority depending on a driving rationale.

Figure 5:
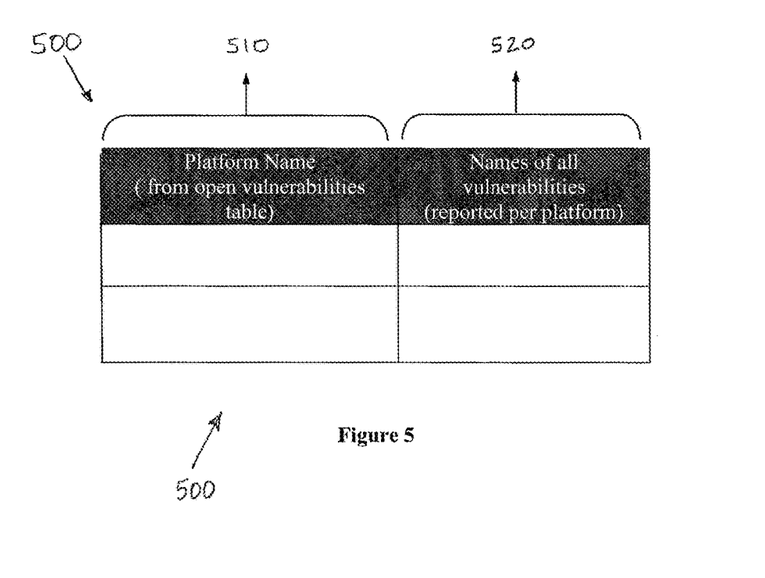
FIG. 5 shows the list of all vulnerabilities that have been reported per platform to the NIST/MITRE CVE repository for all the platforms listed in the above-mentioned Open Vulnerabilities table.

FIG. 5 shows an all vulnerabilities table 500 reported per platform for all the platforms listed in the abovementioned open vulnerabilities table 400. The system may include a list of all vulnerabilities reported per platform 520 for all the platforms 510 listed in the abovementioned open vulnerabilities table 400 to the NIST/MITRE CVE repository.

Figure 6:
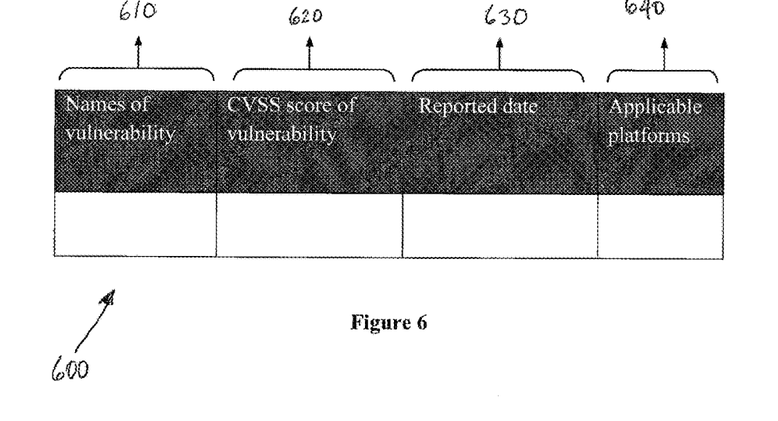
FIG. 6 shows the enriched All Vulnerabilities data table.

FIG. 6 shows an enhanced all vulnerabilities data table 600 derived from the all vulnerabilities table 500. The system involves a step of adding the following information for the names of vulnerabilities 610 in the all vulnerabilities data table 500.

The CVSS score of all vulnerabilities 620. This data can be derived from the NVD CVE repository.

The reported date 630, when the vulnerability was reported to NIST/MITRE. This data can be obtained from the NVD CVE repository.

The applicable platforms 640 that can be obtained from the NVD CVE repository.

Figure 7:
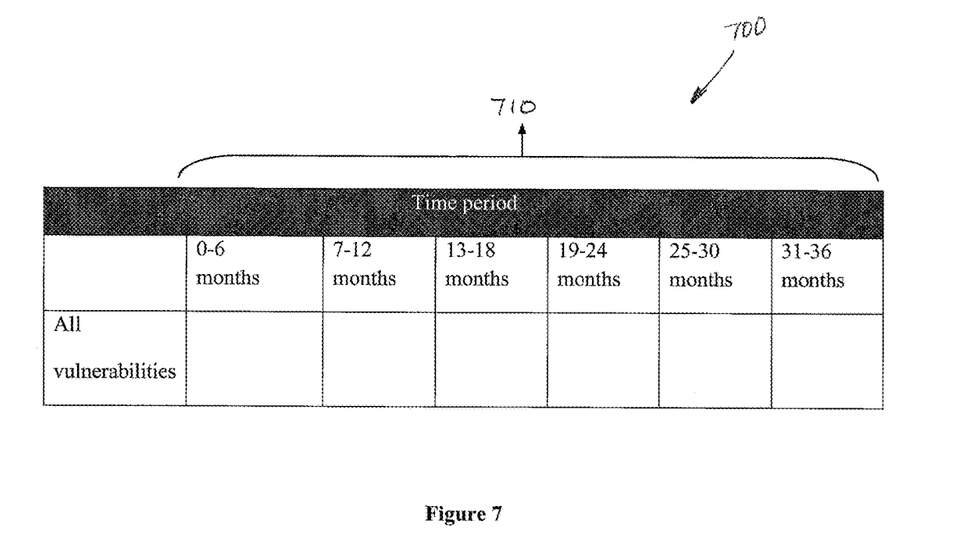
FIG. 7 shows the categorized vulnerabilities in the All Vulnerabilities table divided into increments of 6 months during which the vulnerabilities have been reported to NIST/MITRE.

FIG. 7 shows an all vulnerabilities timeline table 700 organized into blocks of 6 months based on the time 710 at which the vulnerability has been reported to NIST/MITRE.

Figure 8:
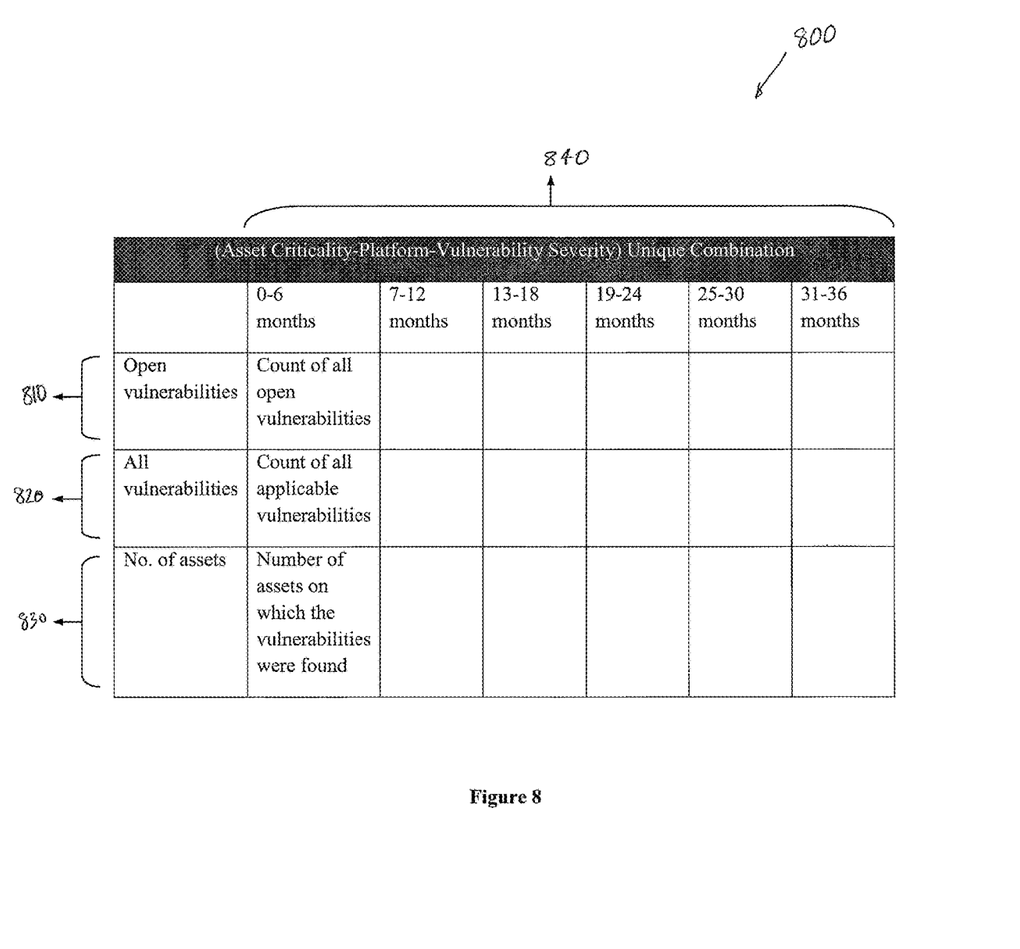
FIG. 8 shows the Asset Criticality, Platform, and Vulnerability Severity table when asset information is known.

FIG. 8 shows an asset criticality, platform, and vulnerability severity table 800 is to be created when asset information is known. The system may include the steps in which the tables are to be created for open vulnerabilities 810, all vulnerabilities 820; categorized into blocks of 6 months 840 based on the time at which the vulnerability was reported to NIST/MITRE. A further step may include the addition of the number of assets 830 for every row in the above table categorized into blocks of 6 months. This step may also involve the counting of all open vulnerabilities, all vulnerabilities, and the number of assets, categorized into blocks of 6 months, respectively 840, to obtain the asset criticality, platform, and vulnerability severity table. These tables formed for all combinations of asset criticality, platform, and vulnerability severity may be used to calculate the probability of open vulnerabilities for similar assets in the following steps.

Step 1.1:

The numbers of tables that can be formed on all combinations of asset criticality, platform, and vulnerability severity. For example: Assuming a case wherein the criticality of the asset can have three values, namely: High, Medium, or Low; the platform on which the assets are based can be either Windows or Ubuntu; the vulnerability severity of the asset can have four values, namely: Critical, High, Medium or Low. Based on the above data there will be a total of (3×2×4=24) corresponding asset criticality, platform, and vulnerability severity tables.

Step 1.2:

When a threat alert has been raised, the following may be checked: the criticality of the asset for which the alert has been raised; the platform information of the asset for which the threat alert has been raised; the corresponding vulnerability/vulnerabilities for the threat alert; the severity of the corresponding vulnerability and the time when the corresponding vulnerability has been reported to NIST/MITRE.

Step 1.3:

For the unique combination of asset criticality, vulnerability severity, and platform, the probability of a vulnerability may be calculated by looking up the number of open vulnerabilities, number of assets, and number of all vulnerabilities for the time block in which the corresponding vulnerability has been reported to NIST/MITRE. Then the following formula is applied:

Probability=(no. of open vulnerabilities)/(number of assets*number of all vulnerabilities)

For example:

If, for a unique combination of Asset Criticality, Vulnerability Severity and Platform, the value against open vulnerabilities in 0-6 months period is 52, the value against all vulnerabilities in the same time period is 20, and the value against number of assets is 4; The probability for the corresponding vulnerability is calculated as:

52/(20*4)=52/80=0.65 i.e. 65%.

This percentage shows that the probability of vulnerability for similar assets is 65%.

Figure 9:
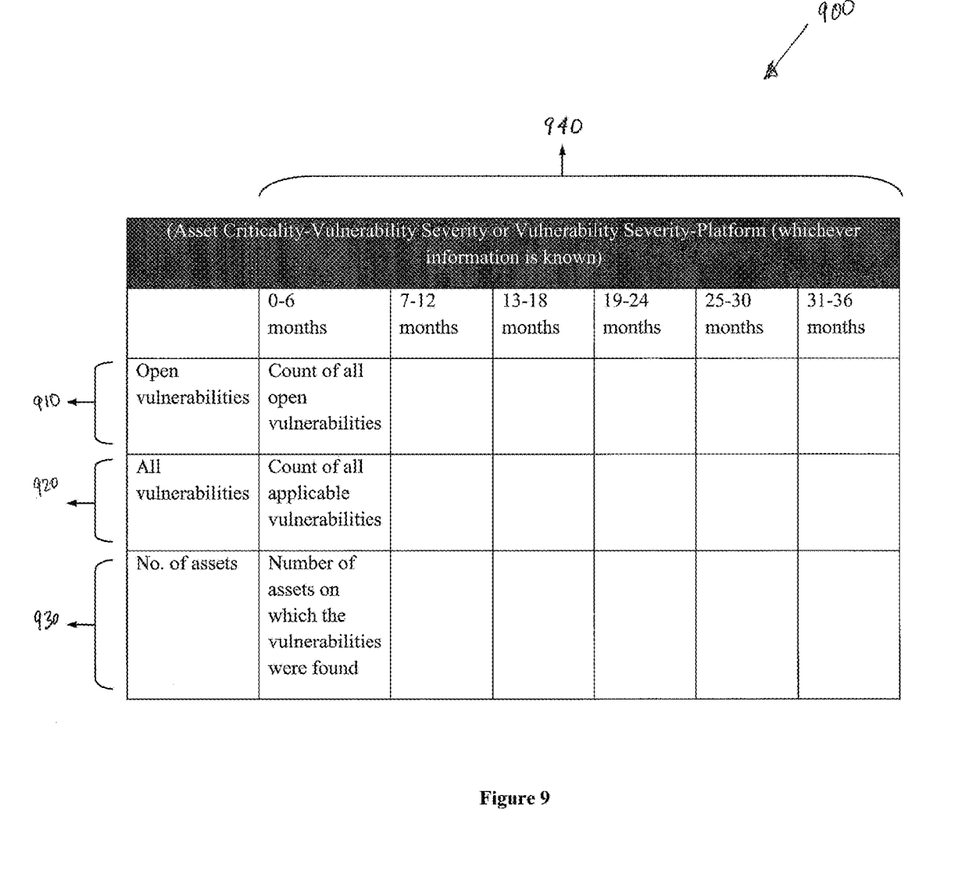
FIG. 9 shows the Asset Criticality and Vulnerability Severity or Vulnerability Severity and Platform (whichever information is known) table when asset information is partially unknown.

FIG. 9 shows an asset criticality and vulnerability severity or vulnerability severity and platform (whichever information is known) table 900 created when asset information is partially unknown. This includes the steps in which the tables may be created for open vulnerabilities 910 and all vulnerabilities 920, categorized into blocks of 6 months 940 based on the time at which the vulnerability has been reported to NIST/MITRE. A further step may include the addition of the number of assets 930 for every row in the table, also categorized into blocks of 6 months 940. This step may involve the counting of all open vulnerabilities, all vulnerabilities, and the number of assets; categorized into blocks of 6 months respectively 940, to obtain the asset criticality and vulnerability severity or vulnerability severity and platform table 900 (whichever information is known).

This table may also be formed in a variation, for every combination of the asset criticality and vulnerability severity or vulnerability severity and platform table (whichever information is known) used to calculate the probability of vulnerability for similar assets in the following steps, Step 2.1:

When a threat alert has been raised check the criticality of the asset for which the alert has been raised or the platform information of the asset for which the threat alert has been raised (whichever is available); the corresponding vulnerability/vulnerabilities for the threat alert; the severity of the corresponding vulnerability: and the time when the corresponding vulnerability has been reported to NIST/MITRE.

Step 2.2:

For combinations of asset criticality and vulnerability severity or vulnerability severity and platform (whichever information is known), calculate the probability of a vulnerability by looking up the values of number of open vulnerabilities, number of assets, and number of all vulnerabilities for the time block in which the corresponding vulnerability has been reported to NIST/MITRE. Following this apply the formula Probability=(no. of open vulnerabilities)/(number of assets*number of all vulnerabilities)

Figure 10:
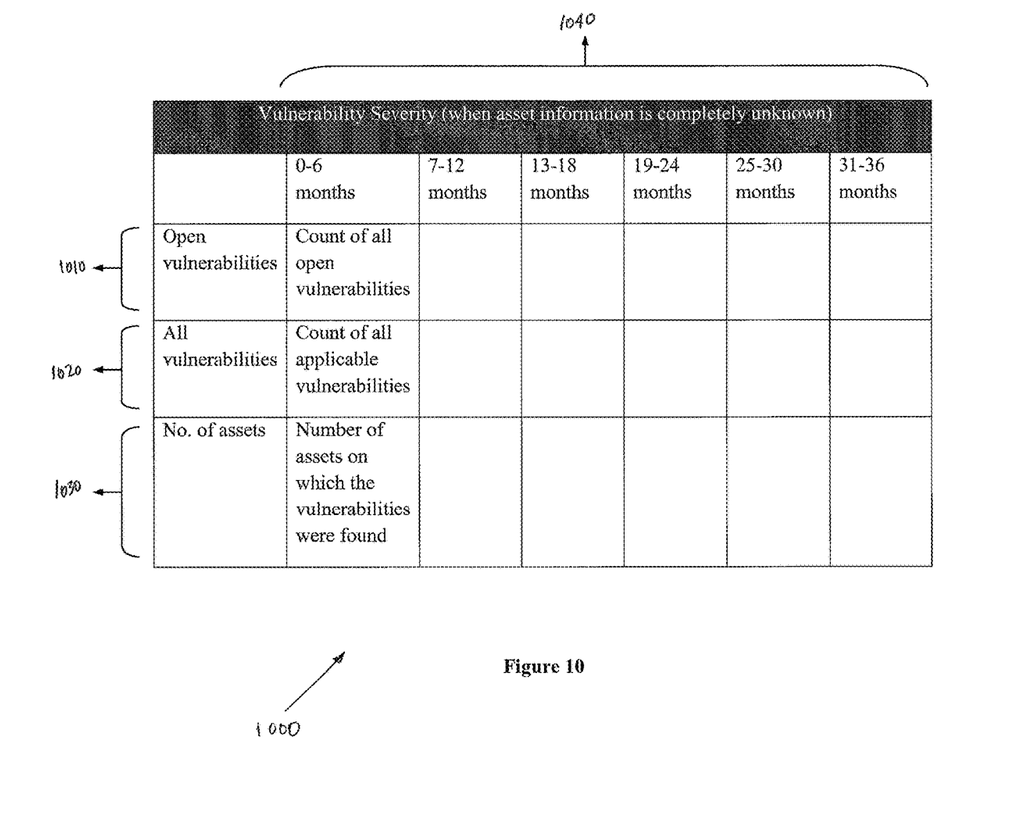
FIG. 10 shows a unique category of the Vulnerability Severity table when the asset information is completely unknown.

FIG. 10 shows a category of vulnerability severity table 1000 is to be created when asset information is completely unknown. The system may include the steps in which the tables are to be created for open vulnerabilities 1010, all vulnerabilities 1020; categorized into blocks of 6 months 1040 based on the time at which the vulnerability was reported to NIST/MITRE. A further step may include the addition of the number of assets 1030 for every row in the above table categorized into blocks of 6 months 1040. This step may also involve the counting of all open vulnerabilities, all vulnerabilities, and the number of assets, categorized into blocks of 6 months, respectively 1040, to obtain a vulnerability severity table 1000. In a variation, these tables may be formed for all vulnerability severities levels used to calculate the probability of vulnerability for similar assets using the following steps:

Step 3.1:

When a threat alert has been raised, find the corresponding vulnerability (CVE)/use CVE to find the severity of that vulnerability, and the time when the vulnerability has been reported to NIST/MITRE.

Step 3.2:

For every unique combination of Vulnerability Severity, calculate the probability of a vulnerability by looking up the values of the number of open vulnerabilities, number of assets, and number of all vulnerabilities for the time block in which the corresponding vulnerability has been reported to NIST/MITRE and apply the following formula:

Probability=(no. of open vulnerabilities)/(number of assets*number of all vulnerabilities)

FIGS. 11A-11F show certain logic flows using the previous tables, that may be programmed into a computer to improve its functioning when dealing with vulnerabilities.

Figure 11A:
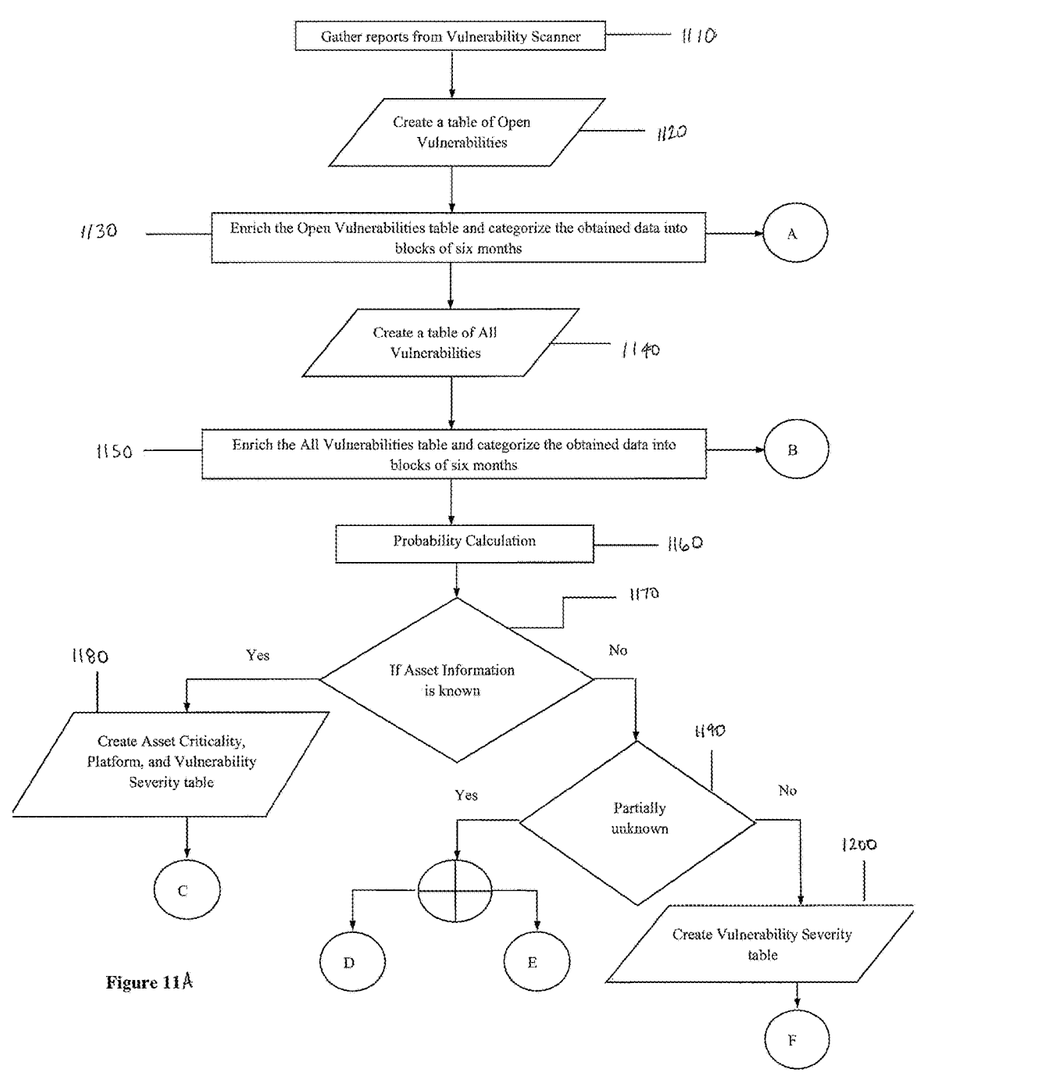
FIGS. 11A-11F show certain logic-driven flows using the previous tables.
Figure 11B:
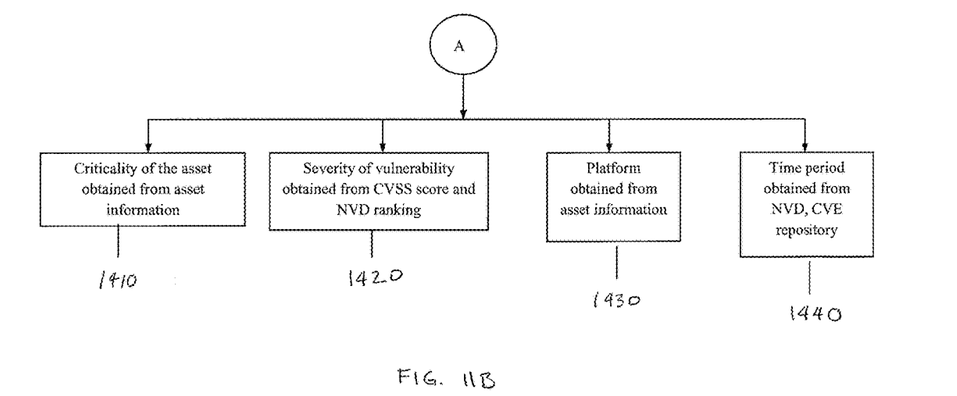
Figure 11C:
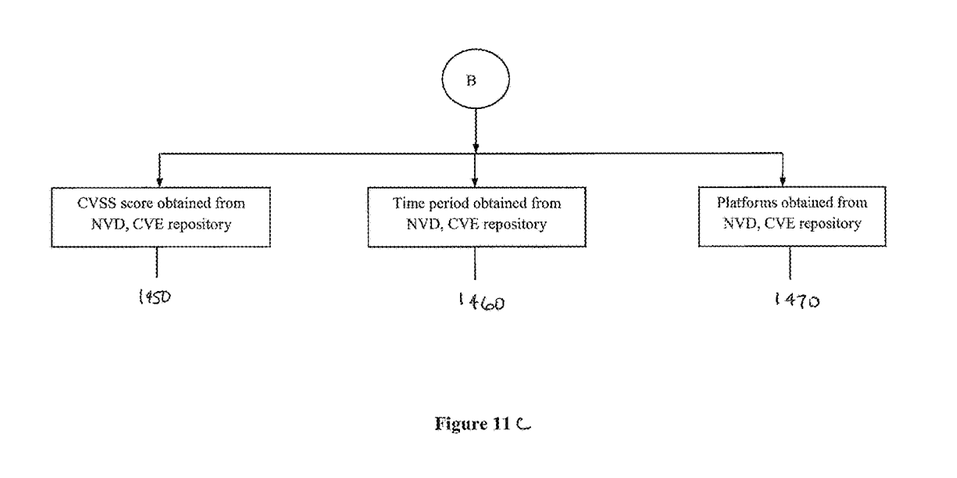

Following the overall logic shown in FIG. 11A, the system gathers the reports from the vulnerability scanner 1110, creates the open vulnerabilities table 1120; enriches the open vulnerabilities table 1130, and categorizes the obtained data into blocks of 6 months 1130. In order to enrich the open vulnerabilities table 200, where the following may be added for each row: criticality of the asset 1410, which is obtained from the asset information; severity of vulnerability 1420 that is to be obtained from the CVSS score and NVD rating; the platform 1430 of the asset on which the vulnerability is to be found, which is obtained from the asset information and the time period 1440 when the vulnerability has been reported to NIST/MITRE to be obtained from NVD, CVE repository.

Following this step, the system may create the all vulnerabilities table 1140, enrich the All Vulnerabilities table and categorize the obtained data into blocks of 6 months 1150. In order to enrich the open vulnerabilities, the following may to be added for each row: a CVSS score 1450 of all vulnerabilities to be obtained from NVD, CVE repository; the time period 1460 when the vulnerability has been reported to NIST/MITRE, as obtained from the NVD, CVE repository; the platforms 1470 on which the vulnerabilities are to be applicable, also obtained from the NVD, CVE repository. This step completes the stage of gathering the data.

A further step, namely, the probability calculation 1160 stage, depends on the data of asset information being known 1170. When the asset information is completely known, the asset criticality, platform, and vulnerability severity table 800 is created 1180. This step is to be followed by the steps of generating all the necessary tables 1480 for the combination of asset criticality, platform, and vulnerability severity. Criticality of the asset 1490, platform information of the asset 1500, severity of the corresponding vulnerability 1510, the time period 1520 when the vulnerability has been reported to NIST/MITRE are to be checked in the next step when an alert for threat is being raised 1530. Following this step, the probability is to be calculated 1540.

Figure 11D:
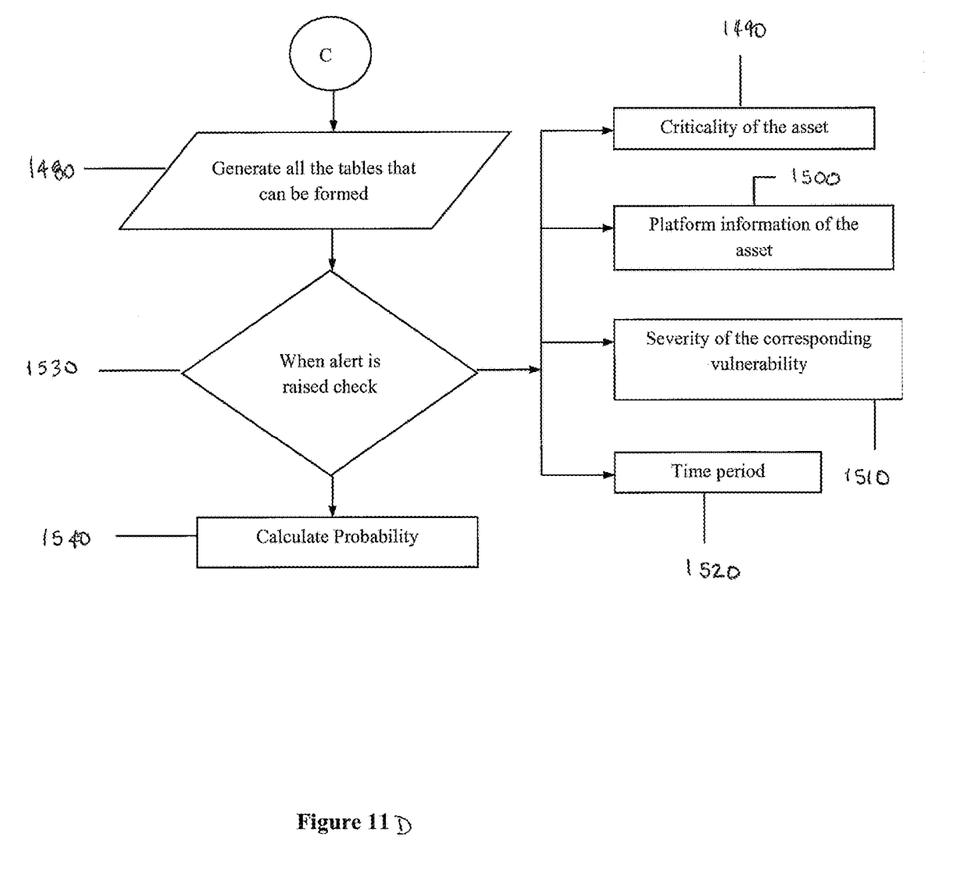

When the asset information is partially unknown 1190 as in case 1 (D) create: asset Criticality and Vulnerability Severity table 1610 (900) This step is to be followed by the steps of generating all the necessary tables 1620 for the combination of asset criticality and vulnerability severity. Criticality of the asset 1630, severity of the corresponding vulnerability 1640, and the time period 1650 when the vulnerability has been reported to NIST/MITRE are to be checked in the next step when an alert for threat has been raised 1625. Following this step, the probability is to be calculated 1660.

Figure 11E:
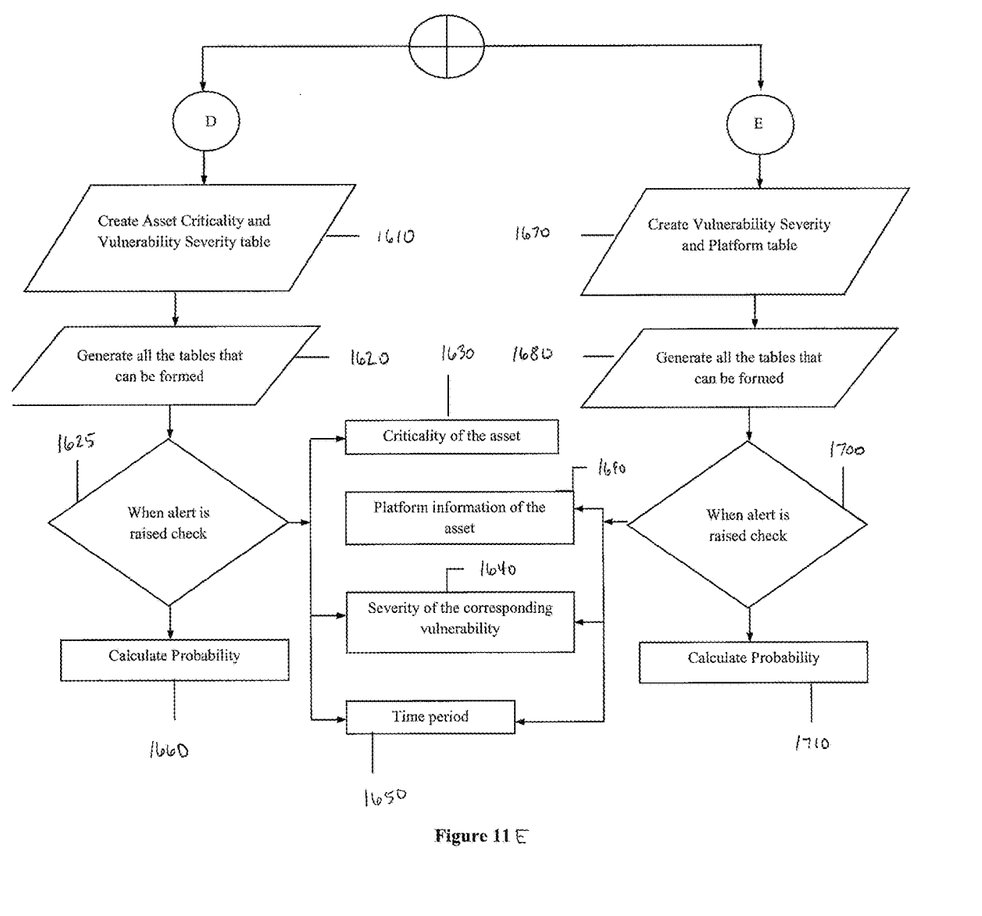

When the asset information is partially unknown, as in case 2 (E), a table 900 showing vulnerability severity and platform information is created 1670. This step is to be followed by the steps of generating all the necessary tables 1680 for the combinations of vulnerability severity and platform information. Platform information of the asset 1690, severity of the corresponding vulnerability 1640, the time period 1650 when the vulnerability has been reported to NIST/MITRE are to be checked in the next step when an alert for threat has been raised 1700. Following this step, the probability is to be calculated 1710.

Given the calculated probability 1710 (also at 1160 and 1860), a vulnerability may be addressed with immediate action taken to block the attacker and more attacks from the attacker IP and/or patching the vulnerability.

Figure 11F:
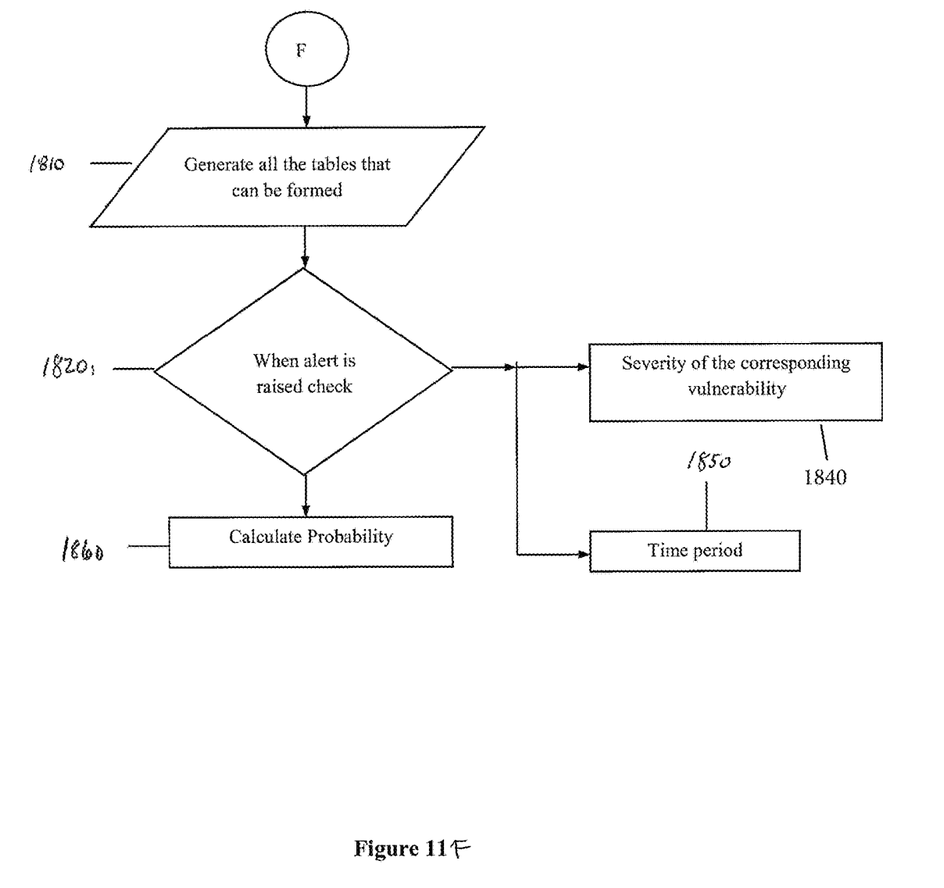

When the asset information is completely unknown 1200, a vulnerability severity table 1000 is created. This step may be followed by the steps of generating all the necessary tables 1810 for vulnerability severity. Severity of the corresponding vulnerability 1840 and the time period 1850 when the vulnerability has been reported to NIST/MITRE are to be checked in the next step when an alert for threat has been raised 1820. Following this step, the probability is to be calculated 1860.

It is to be appreciated that the probabilistic method of the invention is machine-specific. A computer along with the method alone define the functionality or practicality of the invention. Hardware, namely, a computer, a processor, a scan database, and a graphics processor, forms an integral part of the invention and may vary depending on the implementation. The assets mentioned above include examples of hardware, software, and system nodes of a computer network, among others.

While the invention has been described with reference to the embodiments above, a person of ordinary skill in the art would understand that various changes or modifications may be made thereto without departing from the scope of the claims.

The invention claimed is:

1. A method for determining a probability of vulnerability for similar hardware, software, and system nodes assets to known hardware, software, and system nodes assets comprising:
   gathering vulnerability reports with information regarding vulnerabilities of the known assets;
   creating an open vulnerabilities table that is an accumulation of unaddressed vulnerabilities from vulnerability reports, and contains information that identifies vulnerability severity;
   creating an all vulnerabilities table that is an accumulation of unaddressed vulnerabilities from vulnerability reports, and contains information that identifies similar asset vulnerability;
   calculating a probability of vulnerability for the similar assets to the known asset as (number of open vulnerabilities)/(number of the similar assets*number of all vulnerabilities); and
   using the probability to prioritize threats seen against the similar assets and take remedial action for high priority threats; and
   addressing vulnerabilities of the similar assets in an order based on the probability.

2. The method of claim 1, wherein when information corresponding to similar asset criticality, asset vulnerability, and asset platform is known, the method further comprises creating a similar asset criticality, platform, and vulnerability severity table that identifies open vulnerabilities, all vulnerabilities, and the number of similar assets on which the vulnerabilities were found.

3. The method of claim 2, wherein the asset criticality, platform, and vulnerability severity have more than one value, and for each value, the method creates a corresponding similar asset criticality, platform, and vulnerability severity table.

4. The method of claim 3, wherein for each corresponding similar asset criticality, platform, and vulnerability severity table, the method organizes the open vulnerabilities, all vulnerabilities, and number of similar assets in time increments.

5. The method of claim 4, wherein the calculation of the probability of vulnerability for similar assets to the known asset is done using the values in corresponding similar asset criticality, platform, and vulnerability severity table.

6. The method of claim 2, wherein when the similar asset information corresponding to the similar asset criticality, and asset platform, is unknown, the method further comprises creating a vulnerability severity table that identifies open vulnerabilities, all vulnerabilities, and the number of similar assets on which the vulnerabilities were found.

7. The method of claim 6, wherein for every severity, the method organizes the open vulnerabilities, all vulnerabilities, and number of similar assets in time increments.

8. The method of claim 7, wherein the calculation of the probability of vulnerability for similar assets to the known asset is done using values in the vulnerability severity table.

9. The method of claim 1, wherein addressing the vulnerability includes blocking an attacker from the similar asset by prioritizing the threat corresponding to the vulnerability based on probability value.

10. The method of claim 1, wherein addressing the vulnerability includes patching the vulnerability based on the probability.

11. A system that determines a probability of vulnerability for similar hardware, software, and system nodes assets to known hardware, software, and system nodes assets comprising:
    a scanning system that gathers vulnerability reports with information regarding vulnerabilities of the known assets and stores the reports;
    a logic-driven program that creates an open vulnerabilities table that is an accumulation of unaddressed vulnerabilities from vulnerability reports, and contains information that identifies vulnerability severity; creates an all vulnerabilities table that is an accumulation of unaddressed vulnerabilities from vulnerability reports, and contains information that identifies vulnerability severity; calculates a probability of vulnerability for the similar assets to the known asset as (number of open vulnerabilities)/(number of the similar assets*number of all vulnerabilities); and uses the probability to prioritize threats seen against the similar asset and take remedial action for high priority threats; and
    addresses vulnerabilities of assets in an order based on the probability.

12. The system of claim 11, wherein when asset information corresponding to asset criticality, asset vulnerability, and asset platform is known, the logic driven program further creates a similar asset criticality, platform, and vulnerability severity table that identifies open vulnerabilities, all vulnerabilities, and the number of similar assets on which the vulnerabilities were found.

13. The system of claim 12, wherein the asset criticality, platform, and vulnerability severity have more than one value, and for each value, the logic-driven program further creates a corresponding similar asset criticality, platform, and vulnerability severity table.

14. The system of claim 13, wherein for each corresponding similar asset criticality, platform, and vulnerability severity table, the logic-driven program organizes the open vulnerabilities, all vulnerabilities, and number of similar assets in time increments.

15. The system of claim 14, wherein the calculation of the probability of vulnerability for similar assets to the known asset is done using the values in corresponding similar asset criticality, platform, and vulnerability severity table.

* * * * *